Patented June 15, 1954

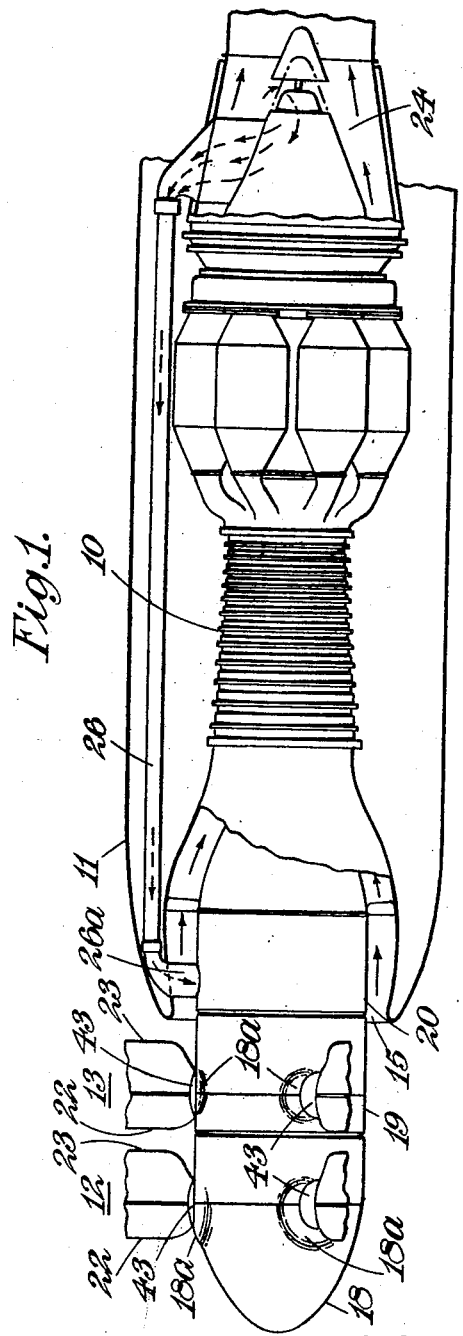

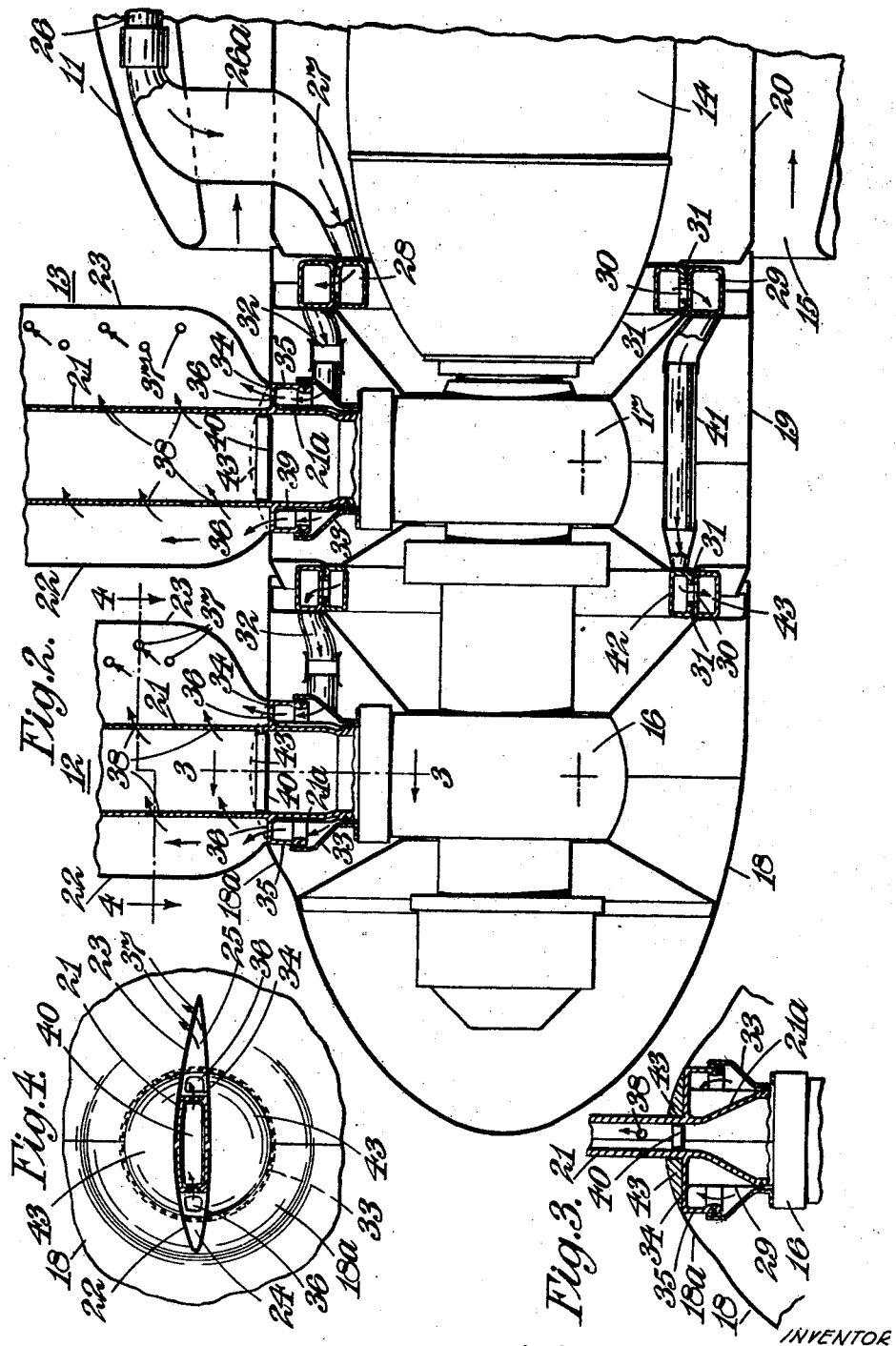

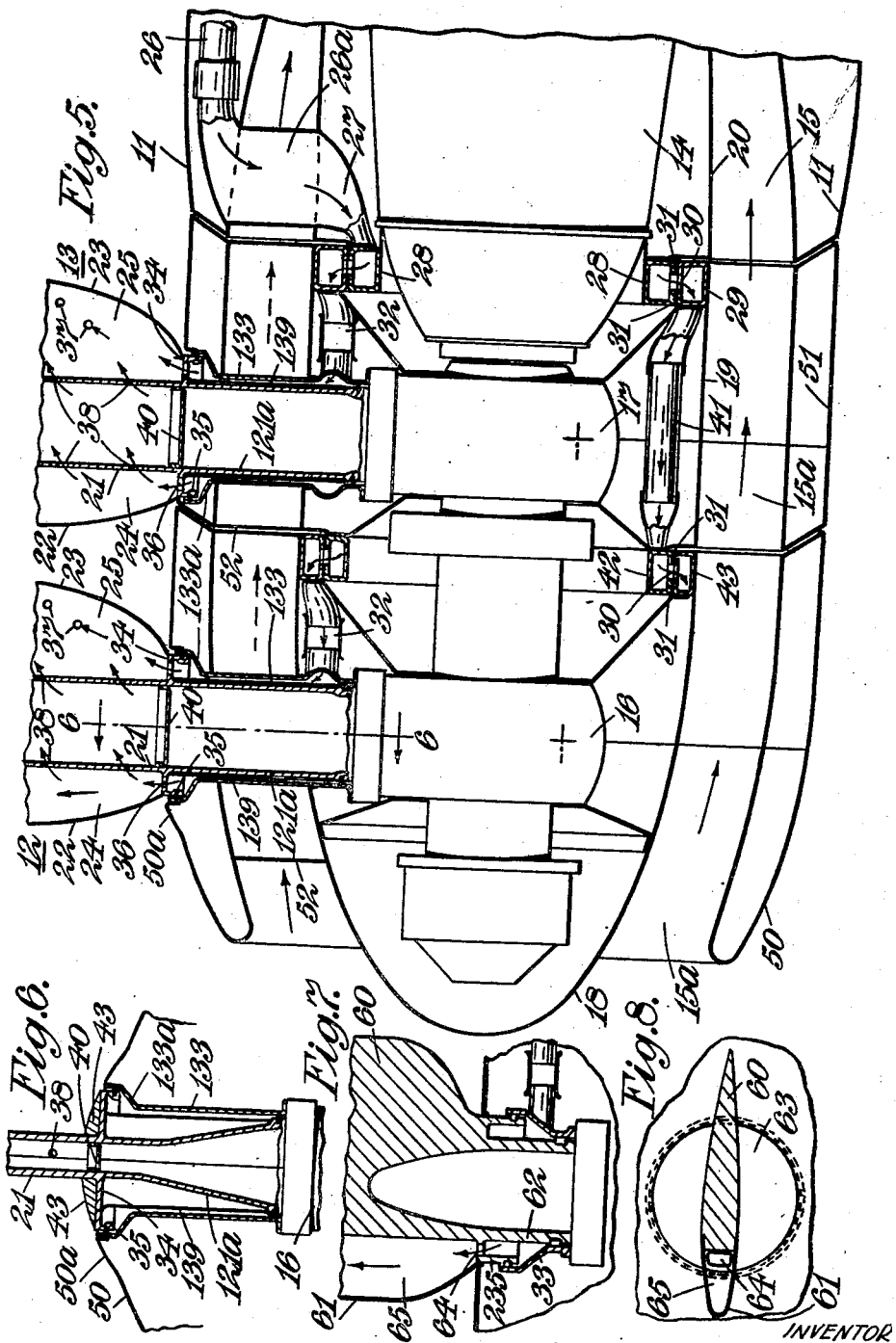

2,681,191

UNITED STATES PATENT OFFICE 2,681,191

AIRSCREW-DRIVING GAS TURBINE ENGINE POWER PLANT WITH ANTI-ICING MEANS FOR THE AIRSCREWS

Albert George Elliott, Quarndon, England, assignor to Rotol Limited, Gloucester, England, a British company Application July 30, 1948, Serial No. 41,536

Claims priority, application Great Britain August 18, 1947

2 Claims. (Cl. 244—134)

This invention relates to aircraft gas-turbine engine power plants of the type comprising an airscrew driven by the gas-turbine engine.

Such a power plant normally comprises a compressor which delivers air to combustion equipment in which fuel is burnt and from which the combustion gases pass to a turbine to drive it. The turbine drives through a shaft or shafts the compressor and an airscrew or airscrews located either in front of the air inlet duct to the compressor or towards the inlet end of the duct. In the latter case, an airscrew carries an outer annular spinner fairing constituting with the airscrew inner spinner a forward, rotating extension of a stationary portion of the air inlet duct. If the turbine drives contra-rotating airscrews, the outer annular fairing may be carried by the rear airscrew or may be formed in two parts, one part on each airscrew.

This invention has for an object to reduce the possibility of ice formation on the airscrew blades.

According to this invention, in a power plant of the type described, an airscrew has hollow blades, and means are provided to deliver hot gas to a spinner structure rotating with the airscrew and for transferring the hot gas from the spinner structure to within the hollow blades.

It is preferred to use airscrews having blades each of which comprises a box-section spar to which are secured leading and trailing surface sections or blades each of which comprises a solid backbone comprising the medial and trailing portions thereof and a leading surface section secured on the backbone, and it is a feature of this invention to deliver the hot gas from the spinner structure through parts in the root ends of the blades to the spaces formed between the walls of the spar and the leading and trailing surface sections of the blades, or to the space between the leading surface section and the backbone.

According to another feature of this invention, the spinner structure includes a muff embracing the root of each airscrew blade and the blade has a closure plate to close the outer end of the muff, hot gas transfer ports being formed in the closure plate to permit hot gas to pass from the muff into the hollow blade. In a power plant of the type in which the airscrew is positioned in front of the air inlet duct, the spar of each blade will extend inwardly through the spinner structure, the leading and trailing surface sections will terminate at their root ends adjacent the outer surface of the spinner structure, and the open end of the muff and its closure plate will be positioned substantially in the outer surface of the spinner structure so that the latter will present a substantially smooth outer surface. Where the airscrew carries an outer annular spinner fairing as above described, the muff will conveniently be extended across the air inlet duct and terminate substantially in the outer surface of the fairing, and the leading and trailing surface sections will extend outwardly beyond the muff.

According to yet another feature of this invention, hot gas is delivered to a stationary manifold located adjacent the rear end of an inner or outer spinner structure and then through openings in the manifold to a second manifold carried by the spinner structure and having a surface registering with a surface of the stationary manifold. The hot gas in such a construction may be directed in a suitable manner from the spinner manifold to the muffs embracing the airscrew blade roots. Where contra-rotating airscrews are provided, these manifolds will be located at the rear end of the rear portion of an inner or outer spinner structure and part of the hot gas from the spinner manifold will be directed through transfer manifolds carried by the front and rear portions of the spinner structure.

A number of embodiments of this invention will now be described, reference being made in the description to the accompanying diagrammatic drawings in which:

Figure 1 is a general elevation showing a gas-turbine engine driving counter-rotating airscrews.

Figure 2 is an enlarged view of the left-hand end of Figure 1 showing the anti-icing arrangement in more detail.

Figure 3 is a section on the line 3—3 of Figure 2,

Figure 4 is a section on the line 4—4 of Figure 2 showing details of the root end of an airscrew blade, Figures 5 and 6 are views corresponding to Figures 2 and 3 of an alternative construction, and Figures 7 and 8 illustrate an alternative construction of airscrew blade suitable for use with the apparatus illustrated in Figures 1 to 6.

Like parts are indicated by like reference numerals in all figures of the drawings.

Referring to Figures 1 to 4, there is illustrated a gas-turbine engine 10 located in a nacelle 11 and driving counter-rotating airscrews 12, 13 through a reduction gear 14.

The airscrews are located ahead of the forward end of the air-intake duct 15 to the engine and the hubs 16, 17 of the airscrews 12, 13 respectively which include the pitch change gear, are enclosed in spinners 18, 19 of which the spinner 18 is of generally conical form and the spinner 19 is substantially cylindrical. The surfaces of the spinners 18, 19 are arranged to form a smooth surface which is a continuation of the inner wall 20 of the air intake 15.

Each of the blades of the airscrews 12, 13 comprises a box-section main spar 21 which is supported at its root end in thrust bearings in the hub and a surface skin formed from two suitably shaped sections 22, 23, the section 22 forming the leading half of the blade and the section 23 forming the trailing half of the blade. The surface sections 22, 23 are secured to the box spar 21 with the edges abutting so that the spar is enclosed by the surface sections and that a space 24 is formed between the front wall of the spar and the section 22 and a second space 25 is formed between the rear wall of the spar and the section 23.

The main spars 21 of the blades extend through the spinners 18, 19 into the hubs 16, 17 and the sections 22, 23 terminate close to the outer surfaces of the spinners 18, 19.

In order to reduce the possibility of ice formation in the blades hot gas is delivered to the blades from any convenient point in the engine.

As illustrated, the hot gas is abstracted from the exhaust unit 24 of the engine 10 in the manner set forth in the specification of British patent application No. 16,931/47.

The hot gas is conveyed forwardly by conduits 26 located within the nacelle 11 and is delivered at the forward end of the nacelle into ducts 26a of aerofoil cross-section which convey the hot gas across the air-intake 16. The hot gas then flows through conduits 27 provided within the inner wall 20 to an annular manifold 28. The manifold 28 is secured to the fixed engine structure and is arranged to project slightly into the rear end of the spinner 19.

Secured to the spinner 19 to closely surround the manifold 28, there is a second annular manifold 29 and transfer apertures 30 are formed in the abutting faces of the manifolds 28, 29 so that the hot gas can flow from the manifold 28 which is stationary into the manifold 29 which rotates with the spinner 19. Gas seals 31 are provided between the edges of the abutting faces of the manifolds to prevent the hot gas from escaping into the spinner.

Part of the hot gas is conveyed by forwardly-directed ducts 32 to a series of tubular muffs 33 which are mounted on the airscrew hub casing so as to be radially disposed of spinner 19.

Each muff 33 surrounds a root end 21a of a blade spar 21 and is spaced from the root end to form an annular space (into which the hot gases are delivered) between the muff and the root end. The outer radial end of each muff 33 is formed with a bell-mouth which has its open end adjacent the surface of the spinner 19 and the inner radial end of each muff is closed by gas seals between the muff and spar 21 (Figures 2 and 3). The blade spar 21 is formed with an outwardly-directed flange 34 level with the surface of the spinner 19 and the flange has a portion 35 which extends inwardly into the bell mouth of the muff 33 to close it. Gas seals are provided between the portion 35 and the muff 33. Transfer ports 36 are formed in the flange 34 to permit hot gas to pass from the muff into the spaces 24, 25 so that the leading and trailing edges of the blades are heated reducing the possibility of ice formation on the blades. Hot gas outlets 37 are provided in the trailing edges of the blades and ports 38 are formed in the front and rear walls of the spar 21 to permit the hot gas to pass from the space 24 through the spar into the space 25 and thus to the outlets 37.

In order to prevent overheating of the root 21a of the spar 21, an annular heat shield 39 is provided within the muff 33 and around the root 21a, the hot gas flowing between the shield 39 and the muff 33. Further, in order to prevent the hot gas penetrating along the box spar into the hub, a baffle 40 is provided within the spar to close it, the baffle is conveniently located level with the flange 34.

The remainder of the hot gas from the manifold 29 is conveyed forwardly by pipes 41 to the inner of a pair of annular transfer manifolds 42, 43, which are similar in construction to the manifolds 28, 29 and are respectively carried by the spinner 19 and the spinner 18. The hot gas then passes to the blades of the airscew 12 in the same manner as that described for the blades of the airscrew 13.

The surface of the spinners in the region where the blade roots pass through them are made to be part spherical, as indicated at 18a in Figures 2 and 3, and the flanges 34 are fitted with domed filter pieces 43 which have part spherical outer surfaces. With this arrangement whatever the pitch position the blades occupy, the spinner and filter pieces present the same shape of surface. The root ends of the surface sections 22, 23 are shaped to blend into the doomed filter pieces.

The arrangement above described can clearly be employed with power-plants driving single airscrews by providing a hot gas transfer arrangement, such as the manifolds 28, 29 between the engine and airscrew spinner and passing the hot gas to the blades in the manner above described.

Referring now to Figures 5 and 6, there is illustrated an alternative counter-rotating airscrew anti-icing arrangement. In this construction, the airscrews 12, 13, in addition to being provided with central spinners 18, 19 respectively, are also provided with hollow annular spinner structures 50, 51 respectively which form rotating continuations of the outer nacelle wall 11, so that the parts 18, 19, 50, 51 form between them a forward continuation 15a of the air-intake 15. Moreover, the root ends 121a of the spars 21 are elongated to extend across the continuation air-intake 15a so that the flanges 34 are located flush with the outer surfaces of the annular spinner structures 50, 51. The root ends 21a are enclosed in aerofoil section fairings 52 where they cross the continuation air intake 15a.

In order to deliver hot gas to the hollow blades of the airscrews, the hot gas is conveyed as in the previously described construction to manifolds 29, 43 rotating respectively with the spinners 19, 18. The hot gas is then conveyed by pipes 32 into an annular space defined between elongated cylindrical muffs 133 (carried on the airscrew hub casing radially of the spinners 18, 19) and the root ends 121a of the main spars 21 of the blades which the muffs surround. The muffs 133 extend outwardly across the continuation air-intake 15a and are formed on their outer radial ends each with a bell-mouthed portion 133a accommodated within the annular spinner structures 50, 51 and the bell mouths are closed by the flanges 34 through the apertures 36 in which the hot gas passes into the spaces 24, 25 in the hollow blades. Elongated heat shields 139 are provided between the muffs 133 and the root ends 121a of the spars 21 to protect them against overheating and baffles 40 are provided in the spars to prevent penetration of the hot gas along the spars 21 into the blades. The inner radial end of the tubular muffs 133 are closed by gas seals as shown in the drawings.

The annular spinner structures 50, 51 are made part-spherical locally in the region of the blade roots as indicated at 50a in Figures 5 and 6, and spherical-surfaced filler pieces 43 are provided on the flanges 34 to form an outer surface which is the same whatever the pitch setting of the blades.

The gas transfer arrangement just described can clearly be employed in a power plant driving a single airscrew having a central spinner and a concentric annular spinner structure.

Referring now to Figures 7 and 8, there is illustrated one alternative form of airscrew blade suitable for use in the constructions above described. In this construction, each blade has a solid backbone 60 shaped to form the medial and trailing portions of the blade and a suitably-shaped leading edge portion 61 secured to the backbone. The backbone 60 has a rest 62 and an outwardly-directed flange 63 is formed at the junction of the root and backbone. This flange 63 has an inwardly-directed skirt 235 which closes the open end of the muff to which the hot gas is delivered as above described. The flange has a single port 64 formed in it to provide the hot gas to pass from the muff into the space 65 within the fairing 61. An outlet for the hot gas from the space 65 may be provided at or close to the tip of the blade.

I claim:

1. For an aircraft, a gas turbine power plant comprising an engine, a variable-pitch airscrew driven by the engine, each blade of the airscrew being hollow, a spinner structure rotating with the airscrew and surrounding the root-portion of the blades, a tubular muff for each blade, said muff being radially disposed of the spinner structure and surrounding the root-portion of the blade within the spinner structure whereby an annular space is formed between the muff and the surrounded root-portion of the blade means which closes the inner radial end of the muff, means to convey hot gas from the engine into the annular space within each muff, a heat shield between each muff and the blade root it surrounds to protect the blade root against overheating and, carried by each blade, a member which closes the outer radial end of the associated muff, said closure members being each formed with at least one port to permit hot gas to pass from the muff into the interior of the hollow blade which has at least one outlet for the hot gas.

2. For an aircraft, a gas turbine power plant comprising an engine, an air intake for the engine, a variable-pitch airscrew driven by the engine, each blade of the airscrew being hollow, a central spinner, an outer annular spinner structure forming a continuation of said engine air intake and surrounding the root-portion of the blades, a tubular muff for each blade, said muff being radially disposed of the spinner structure and surrounding the root-portion of the blade whereby an annular space is formed between the muff and the surrounded root-portion of the blade and extending across the air intake continuation, means which closes the inner radial end of the muff, means to convey hot gas from the engine into the annular space within each muff, a heat shield between each muff and the blade root it surrounds to protect the blade root against over-heating and, carried by each blade, a member which closes the outer radial end of associated muff, said closure members being located adjacent the outer surface of the annular spinner and being each formed with at least one port to permit hot gas to pass from the muff into the interior of the hollow blade which has at least one outlet for the hot gas.

References Cited in the file of this patent

UNITED STATES PATENTS

| Number | Name | Date |
|---|---|---|
| 1,899,689 | Houston | Feb. 28, 1933 |
| 1,942,674 | Whitsett | Jan. 9, 1934 |
| 2,440,115 | Palmatier | Apr. 20, 1948 |
| 2,449,457 | Deen | Sept. 14, 1948 |
| 2,465,007 | Bragdon et al. | Mar. 22, 1949 |
| 2,522,955 | Martin | Sept. 19, 1950 |
| 2,529,103 | Palmatier | Nov. 7, 1950 |
| 2,541,661 | Palmatier et al. | Feb. 13, 1951 |
| 2,553,218 | Stuart et al. | May 15, 1951 |
| 2,592,118 | Chillson et al. | Apr. 8, 1952 |

FOREIGN PATENTS

| Number | Country | Date |
|---|---|---|
| 504,737 | Great Britain | May 1, 1939 |